US011838235B2

United States Patent
Almquist et al.

(10) Patent No.: US 11,838,235 B2
(45) Date of Patent: Dec. 5, 2023

(54) PHYSICAL UPLINK CONTROL CHANNEL FREQUENCY DIVISION MULTIPLEXING WITH INTRA DATA SUBCARRIER ORTHOGONAL COVER CODES

(71) Applicant: Telefonaktiebolaget LM Ericsson (publ), Stockholm (SE)

(72) Inventors: Gustav Almquist, Järfälla (SE); Tai Do, Lund (SE); Stephen Grant, Pleasanton, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 540 days.

(21) Appl. No.: 17/053,279

(22) PCT Filed: May 8, 2019

(86) PCT No.: PCT/EP2019/061873
§ 371 (c)(1),
(2) Date: Nov. 5, 2020

(87) PCT Pub. No.: WO2019/215260
PCT Pub. Date: Nov. 14, 2019

(65) Prior Publication Data
US 2023/0198705 A1 Jun. 22, 2023

Related U.S. Application Data

(60) Provisional application No. 62/669,631, filed on May 10, 2018.

(51) Int. Cl.
*H04L 5/00* (2006.01)
*H04L 27/26* (2006.01)

(52) U.S. Cl.
CPC .......... *H04L 5/0051* (2013.01); *H04L 5/0007* (2013.01); *H04L 27/2607* (2013.01)

(58) Field of Classification Search
CPC .... H04J 13/004; H04L 5/0051; H04L 5/0007; H04L 27/2607; H04L 5/0053; H04L 5/0064; H04L 5/0016
See application file for complete search history.

(56) References Cited

U.S. PATENT DOCUMENTS

| | | | | |
|---|---|---|---|---|
| 2012/0014320 A1* | 1/2012 | Nam | ..................... | H04L 1/1671 370/328 |
| 2014/0036850 A1* | 2/2014 | Akimoto | ............... | H04J 13/004 370/329 |
| 2014/0313997 A1* | 10/2014 | Xu | ...................... | H04L 27/2613 370/329 |
| 2015/0271814 A1* | 9/2015 | Park | ..................... | H04W 72/23 370/329 |

(Continued)

FOREIGN PATENT DOCUMENTS

| | | |
|---|---|---|
| CN | 107294691 A | 10/2017 |
| WO | 2014046516 A1 | 3/2014 |

(Continued)

OTHER PUBLICATIONS

"Physical Uplink Control Channel Design for 5G New Radio"; Kundu et al.; 2018 IEEE 5G World Forum (5GWF); Jul. 9, 2018 (Year: 2018).*

(Continued)

*Primary Examiner* — Benjamin H Elliott, IV
(74) *Attorney, Agent, or Firm* — Christopher & Weisberg, P.A.

(57) ABSTRACT

A method, wireless device, and network node for increasing the capacity on a control channel when using Frequency Division Multiplexing (FDM) of data and DMRS are disclosed. According to one aspect, a wireless device (WD) is configured to perform intra-symbol frequency division multiplexing of data subcarriers and demodulation reference signal, DMRS, subcarriers. The WD is also configured to (Continued)

apply intra-symbol orthogonal cover codes, OCCs, to the data subcarriers. The WD is further configured to apply intra-symbol cyclic shifts to the DMRS subcarriers.

20 Claims, 11 Drawing Sheets

(56) References Cited

U.S. PATENT DOCUMENTS

| | | | |
|---|---|---|---|
| 2017/0164352 A1* | 6/2017 | Yang | H04W 72/21 |
| 2017/0215206 A1* | 7/2017 | Cheng | H04W 72/21 |
| 2017/0289924 A1* | 10/2017 | Fu | H04L 5/0051 |
| 2018/0026684 A1* | 1/2018 | Wei | H04L 5/0007 370/329 |
| 2019/0020518 A1* | 1/2019 | Zhang | H04L 27/2613 |
| 2020/0007293 A1* | 1/2020 | Wei | H04L 5/0053 |
| 2020/0008228 A1* | 1/2020 | Lee | H04L 5/001 |
| 2020/0154481 A1* | 5/2020 | Goto | H04W 28/04 |
| 2022/0200775 A1* | 6/2022 | Tang | H04W 72/23 |
| 2022/0369421 A1* | 11/2022 | Zhou | H04L 5/0094 |
| 2023/0198705 A1* | 6/2023 | Almquist | H04L 5/0016 370/330 |

FOREIGN PATENT DOCUMENTS

| | | |
|---|---|---|
| WO | 2017098414 A1 | 6/2017 |
| WO | 2018027887 A1 | 2/2018 |

OTHER PUBLICATIONS

International Search Report and Written Opinion dated Jul. 23, 2019 for International Application No. PCT/EP2019/061873 filed on May 8, 2019, consisting of 11-pages.

TSG-RAN WG1 NR AH Meeting #2 R1-1711677; Title: Summary of the E-mail Discussion [89-21]: On Long PUCCH for NR; Agenda Item: 5.1.3.2.2; Source: Ericsson; Document for: Discussion and Decision; Date and Location: Jun. 27-30, 2017, Qingdao, China, consisting of 25-pages.

International Preliminary Report on Patentability dated Jul. 22, 2020 for International Application No. PCT/EP2019/061873 filed on May 8, 2019, consisting of 12-pages.

Chinese Office Action and English Summary dated Jul. 21, 2023 for Application No. 201980046145.6, consisting of 7 pages.

* cited by examiner

PHYSICAL UPLINK CONTROL CHANNEL FREQUENCY DIVISION MULTIPLEXING WITH INTRA DATA SUBCARRIER ORTHOGONAL COVER CODES

CROSS-REFERENCE TO RELATED APPLICATIONS

This application is a Submission Under 35 U.S.C. § 371 for U.S. National Stage Patent Application of International Application No.: PCT/EP2019/061873, filed May 8, 2019 entitled "PHYSICAL UPLINK CONTROL CHANNEL FREQUENCY DIVISION MULTIPLEXING WITH INTRA DATA SUBCARRIER ORTHOGONAL COVER CODES," which claims priority to U.S. Provisional Application No. 62/669,631, filed May 10, 2018, entitled "PHYSICAL UPLINK CONTROL CHANNEL FREQUENCY DIVISION MULTIPLEXING WITH INTRA DATA SUBCARRIER ORTHOGONAL COVER CODES," the entireties of both of which are incorporated herein by reference.

TECHNICAL FIELD

The present disclosure relates to wireless communications, and in particular, to increasing the capacity of a control channel when using Frequency Division Multiplexing (FDM) of data subcarriers and demodulation reference signals (DMRS) subcarriers.

BACKGROUND

The New radio (NR) standard, also referred to as Fifth Generation (5G), in the Third Generation Partnership Project (3GPP) is being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rates with moderate latency and moderate coverage, while URLLC service requires a low latency and highly reliable transmission for moderate data rates.

One solution for low latency data transmission is shorter transmission time intervals (TTIs). In NR, in addition to transmission in a slot, a mini-slot transmission is also permitted, which aids in reducing latency. A mini-slot may consist of any number of 1 to 14 orthogonal frequency division multiplexing (OFDM) symbols. It should be noted that the concepts of slot and mini-slot are not specific to a specific service, meaning that a mini-slot may be used for eMBB, URLLC, or other services.

In 3GPP Rel-15 NR, a wireless device (WD) can be configured with up to four carrier bandwidth parts in the downlink (DL), i.e., from the network node to the WD, with a single downlink carrier bandwidth part being active at a given time. A WD can be configured with up to four carrier bandwidth parts in the uplink (UL), i.e., from the WD to the network node, with a single uplink carrier bandwidth part being active at a given time. If a WD is configured with a supplementary uplink, the WD can in addition be configured with up to four carrier bandwidth parts in the supplementary uplink with a single supplementary uplink carrier bandwidth part being active at a given time.

For a carrier bandwidth part (BWP) with a given numerology $\mu_i$, a contiguous set of physical resource blocks (PRBs) are defined and numbered from 0 to $N_{BWPi}^{size}-1$, where i is the index of the carrier bandwidth part. A resource block (RB) is defined as 12 consecutive subcarriers in the frequency domain.

Multiple OFDM numerologies are supported in NR as given by Table 1, where the subcarrier spacing, $\Delta f$, and the cyclic prefix for a carrier bandwidth part are configured by different higher layer parameters for downlink and uplink, respectively.

TABLE 1

| $\mu$ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

A downlink physical channel corresponds to a set of resource elements carrying information originating from higher layers from a base station or network node to a wireless device (WD). The following downlink physical channels may be defined:
  Physical Downlink Shared Channel, PDSCH
  Physical Broadcast Channel, PBCH
  Physical Downlink Control Channel, PDCCH:
  The PDSCH is the main physical channel used for unicast downlink data transmission, and also for transmission of RAR (random access response), certain system information blocks, and paging information. The PBCH carries the basic system information required by the WD to access the network. The PDCCH is used for transmitting downlink control information (DCI), mainly scheduling decisions, required for reception of the PDSCH, and for uplink scheduling grants enabling transmission on the physical uplink shared channel (PUSCH).

An uplink physical channel corresponds to a set of resource elements carrying information originating from higher layers from the wireless device to the base station or network node. The following uplink physical channels are defined:
  Physical Uplink Shared Channel, PUSCH
  Physical Uplink Control Channel, PUCCH
  Physical Random Access Channel, PRACH
  The PUSCH is the uplink counterpart to the PDSCH. The PUCCH is used by WDs to transmit uplink control information, including hybrid automatic repeat request (HARQ) acknowledgements, channel state information (CSI) reports, etc. The PRACH is used for random access preamble transmission.

In general, a WD may determine the resource block (RB) assignment in the frequency domain for the PUSCH or the PDSCH using the resource allocation field in the detected downlink control information (DCI) carried in the PDCCH. For the PUSCH carrying Msg3 in a random-access procedure, the frequency domain resource assignment is signaled by using the uplink (UL) grant contained in RAR.

In NR, two frequency resource allocation schemes, type 0 and type 1, are supported for the PUSCH and the PDSCH. Which type to use for a PUSCH/PDSCH transmission is either defined by a radio resource control (RRC) configured parameter or indicated directly in the corresponding DCI or UL grant in RAR (for which type 1 is used).

The RB indexing for uplink/downlink type 0 and type 1 resource allocation is determined within the WD's active carrier bandwidth part, and the WD may, upon detection of the PDCCH intended for the WD, determine first the uplink/ downlink carrier bandwidth part and then the resource allocation within the carrier bandwidth part (BWP). The UL BWP for the PUSCH carrying Msg3 is configured by higher layer, e.g., higher Open System Interconnect (OSI) parameters.

For cell search and initial access, these channels may be included: synchronization signal/physical broadcast channel (SS/PBCH) block, the PDSCH carrying remaining minimum system information (RMSI), RAR and MSG4 scheduled by the PDCCH channels carrying DCI, PRACH channels and the PUSCH channel carrying Msg3.

Synchronization signal and PBCH block (SS/PBCH block, or SSB for short) includes the above signals (primary synchronization signal (PSS), secondary synchronization signal (SSS) and PBCH demodulation reference signal (DMRS)), and PBCH. In some embodiments, the SSB may have 15 kHz, 30 kHz, 120 kHz or 240 kHz subcarrier spacing (SCS) depending on the frequency range.

NR-Unlicensed (NR-U) systems are being studied in 3GPP to bring NR to the unlicensed bands. Two requirements are commonly found in regulations for operation in unlicensed spectrum: (1) occupied channel bandwidth, and (2) maximum power spectral density (PSD). The occupied bandwidth requirement states that the transmitted signal power should occupy a large portion of the declared Nominal Channel Bandwidth. Maximum PSD requirements exist in many different regions. The implication of the PSD requirement is that without a proper physical layer signal design, a signal with small transmission bandwidth will be limited in transmission power. This can negatively affect coverage.

This can be solved by introducing frequency domain interlaced transmissions in the UL, i.e., multiple PRBs are spread over the available bandwidth. This allows a WD to transmit with higher power (and, to a lesser extent, to satisfy the occupied channel bandwidth requirement) even when the scheduled bandwidth needed is small. It is expected that NR adopts a similar design philosophy to support unlicensed operations.

Since the NR-U signal will be spread in frequency, to comply with the unlicensed requirements, typically covering more PRBs than covered for corresponding transmissions in NR, the overall multiplexing capacity of the system is lowered.

SUMMARY

Some embodiments advantageously provide methods, network nodes and wireless devices for increasing the capacity on a control channel when using Frequency Division Multiplexing (FDM) of data and DMRS by applying cyclic shifts on the DMRS subcarriers and applying intra symbol Orthogonal Cover Codes (OCCs) to at least one of the data subcarriers and the DMRS subcarriers.

According to one aspect, a WD, is configured to communicate with a network node on an uplink control channel. The WD includes processing circuitry configured to configure the uplink control channel by performing intra-symbol frequency division multiplexing of data subcarriers and demodulation reference signal, DMRS, subcarrier. The uplink control channel is further configured by applying intra-symbol orthogonal cover codes, OCCs, to the data subcarrier, and applying intra-symbol cyclic shifts to the DMRS subcarriers.

According to this aspect, in some embodiments, the processing circuitry is further configured to configure the uplink control channel by applying inter-symbol OCCs to both the data subcarriers and the DMRS subcarriers. In some embodiments, the data subcarriers are modulated DMRS sequences to which cyclic shifts are applied. In some embodiments, cyclic shifts applied to the data subcarriers are the same as cyclic shifts applied to the DMRS subcarriers. In some embodiments, the control channel is a modified New Radio physical uplink control channel, NR PUCCH, format 2 having a multiplexing capacity of 4 WDs per physical resource block, PRB. In some embodiments, a PRB carries 2 quadrature phase shift keyed symbols. In some embodiments, the control channel is a modified New Radio physical uplink control channel, NR PUCCH, format 2 having a multiplexing capacity of 6 WDs per physical resource block, PRB, wherein a number of multiplexed data subcarriers and DMRS subcarriers is six each. In some embodiments, a PRB carries 1 quadrature phase shift keyed symbol. In some embodiments, a total length of a DMRS and/or a data sequence is less than or equal to 12 subcarriers. In some embodiments, the DMRS and data sequences are mapped to non-contiguous subcarriers.

According to another aspect, a method in a wireless device, WD, configured to communicate with a network node on an uplink control channel is provided. The method includes performing intra-symbol frequency division multiplexing of data subcarriers and demodulation reference signal, DMRS, subcarriers. The method further includes applying intra-symbol orthogonal cover codes, OCCs, to the data subcarriers. The method also includes applying intra-symbol cyclic shifts to the DMRS subcarriers.

According to this aspect, in some embodiments, the method further includes applying inter-symbol OCCs to both the data subcarriers and the DMRS subcarriers. In some embodiments, the data subcarriers are modulated DMRS sequences to which cyclic shifts are applied. In some embodiments, cyclic shifts applied to the data subcarriers are the same as cyclic shifts applied to the DMRS subcarriers. In some embodiments, the control channel is a modified New Radio physical uplink control channel, NR PUCCH, format 2 having a multiplexing capacity of 4 WDs per physical resource block, PRB. In some embodiments, a PRB carries 2 quadrature phase shift keyed symbols. In some embodiments, the control channel is a modified New Radio physical uplink control channel, NR PUCCH, format 2 having a multiplexing capacity of 6 WDs per physical resource block, PRB, wherein a number of multiplexed data subcarriers and DMRS subcarriers is six each. In some embodiments, a PRB carries 1 quadrature phase shift keyed symbol. In some embodiments, a total length of a DMRS and/or a data sequence is less than or equal to 12 subcarriers. In some embodiments, the DMRS and data sequences are mapped to non-contiguous subcarriers.

According to yet another aspect, a network node is configured to receive an uplink control channel from each of a plurality of wireless devices, WD. The network node includes processing circuitry configured to receive signals on an uplink control channel from a plurality of WDs, the signals having data subcarriers and demodulation reference signals, DMRS. The processing circuitry is further configured to apply an intra-symbol orthogonal cover code to data subcarriers received in the uplink control channel, the intra-symbol OCC being associated with a particular one of the plurality of WDs. The processing circuitry is also configured to apply intra-symbol cyclic shifts to the DMRS received in the uplink control channel, the cyclic shifts being associated with the particular one of the plurality of WDs.

According to this aspect, in some embodiments, the processing circuitry is further configured to apply an inter-symbol OCC to both the data subcarriers and the DMRS received in the uplink control channel, the inter-symbol OCC being associated with the particular one of the plurality of WDs. In some embodiments, the uplink control channel is a New Radio physical uplink control channel, NR PUCCH, format 2 having a multiplexing capacity of 4 WDs per physical resource block, PRB. In some embodiments, a PRB carries 2 quadrature phase shift keyed symbols. In some embodiments, the control channel is a New Radio physical uplink control channel, NR PUCCH, format 2 having a multiplexing capacity of 6 WDs per physical resource block, PRB, wherein a number of multiplexed data subcarriers and DMRS subcarriers is six each. In some embodiments, a PRB carries 1 quadrature phase shift keyed symbol.

According to another aspect, a method in a network node configured to receive an uplink control channel from each of a plurality of wireless devices is provided. The method includes receiving signals on an uplink control channel from a plurality of WDs, the signals having data subcarriers and demodulation reference signals, DMRS. The method further includes applying an intra-symbol orthogonal cover code to data subcarriers received in the uplink control channel, the intra-symbol OCC being associated with a particular one of the plurality of WDs. The method also includes applying intra-symbol cyclic shifts to the DMRS received in the uplink control channel, the cyclic shifts being associated with the particular one of the plurality of WDs.

According to this aspect, in some embodiments, the method further includes applying an inter-symbol OCC to both the data subcarriers and the DMRS received in the uplink control channel, the inter-symbol OCC being associated with the particular one of the plurality of WDs. In some embodiments, the uplink control channel is a New Radio physical uplink control channel, NR PUCCH, format 2 having a multiplexing capacity of 4 WDs per physical resource block, PRB. In some embodiments, a PRB carries 2 quadrature phase shift keyed symbols. In some embodiments, the control channel is a New Radio physical uplink control channel, NR PUCCH, format 2 having a multiplexing capacity of 6 WDs per physical resource block, PRB, wherein a number of multiplexed data subcarriers and DMRS subcarriers is six each. In some embodiments, a PRB carries 1 quadrature phase shift keyed symbol.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
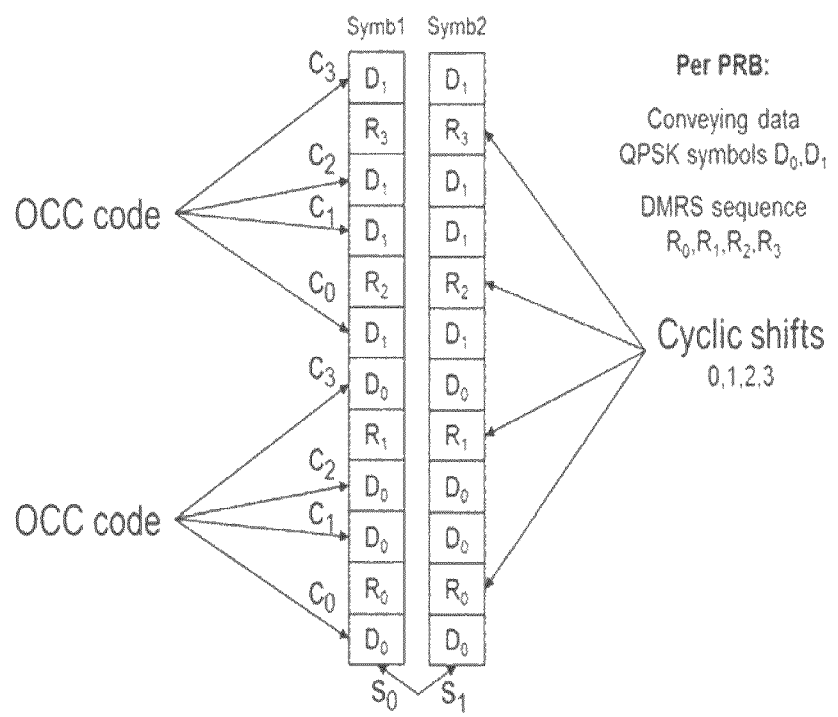
FIG. 1 is an illustration of multiplexing of data subcarriers and DMRS subcarriers according to some embodiments of the present disclosure.

Before describing in detail exemplary embodiments, it is noted that the embodiments reside primarily in combinations of apparatus components and processing steps related to increasing the capacity of a control channel when using Frequency Division Multiplexing (FDM) of data subcarriers and demodulation reference signals (DMRS) subcarriers. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

The term signal used herein can be any physical signal or physical channel. Examples of physical signals are reference signal such as PSS, SSS, CRS, PRS etc. The term physical channel (e.g., in the context of channel reception) used herein is also called as 'channel. Examples of physical channels are MIB, PBCH, NPBCH, PDCCH, PDSCH, sPUCCH, sPDSCH. sPUCCH. sPUSCH, MPDCCH, NPDCCH, NPDSCH, E-PDCCH, PUSCH, PUCCH, NPUSCH etc. These terms/abbreviations may be used according to 3GPP standard language, in particular according to LTE.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station, eNB or gNB. An uplink direction may refer to a data transfer direction from a terminal to a network node, e.g., base station and/or relay station. A downlink direction may refer to a data transfer direction from a network node, e.g., base station, eNB, gNB and/or relay node, to a WD. UL and DL may be associated to different frequency resources, e.g., carriers and/or spectral bands. A cell may comprise at least one uplink carrier and at least one downlink carrier, which may have different frequency bands. A network node, e.g., a base station, gNB or eNodeB, may be adapted to provide and/or define and/or control one or more cells, e.g., a PCell and/or a LA cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g., a WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements according to embodiments of the present disclosure.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DM-RS according to 3GPP and/or NR and/or LTE technologies. Demodulation reference signaling may generally be considered to represent signaling providing reference for a receiving device like a terminal to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may, e.g., cover a symbol time length and a subcarrier, in particular in 3GPP and/or LTE and/or NR standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

Data or information may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for increasing the capacity of a control channel of a New Radio unlicensed (NR-U) system using Frequency Division Multiplexing (FDM) of data subcarriers and DMRS subcarriers by applying intra-symbol cyclic shifts to the DMRS and applying intra-symbol Orthogonal Cover Codes (OCCs) to the data subcarriers.

For example, methods are provided to increase multiplexing for formats using frequency division multiplexing (FDM) between data subcarriers and demodulation reference signal (DMRS) subcarriers. New Radio (NR) physical uplink control channel (PUCCH) format 2, for example, has 8 data subcarriers and 4 DMRS subcarriers per physical resource block (PRB) and symbol. Since there are 4 DMRS subcarriers available, then there are 4 orthogonal cyclic shifts of the DMRS available for each PRB. These cyclic shifts can together with an Orthogonal Cover Code (OCC) on the data subcarriers be used to multiplex 4 WDs per PRB and symbol. In some embodiments, an NR PUCCH format may be implemented where a number of multiplexed data subcarriers and DMRS subcarriers is six each in order to multiplex 6 WDs. Although 4 and 6 multiplexed WDs are discussed herein, some embodiments may multiplex a different number of WDs.

Expanding the current NR PUCCH formats to cover more PRBs will, unless compensated for, have an impact on user multiplexing. For example, considering a subcarrier spacing (SCS) of 15 kHz and an interlace design utilizing 10 PRBs per interlace, an NR-Unlicensed format derived by simply mapping an NR format originally using only one PRB to multiple PRBs will have a multiplexing capacity of only $\frac{1}{10}$ of the NR format. Maintaining a reasonable multiplexing capacity when designing NR-U PUCCH may be important for the overall system capacity of NR-U.

Depending on the coherence bandwidth of the channel, the interlaced design, which spreads the signal in frequency, will give frequency diversity gains without the need for frequency hopping.

All PUCCH transmissions in NR-U may be subject to a Listen Before Talk (LBT) procedure, which will avoid transmitting PUCCH when the air interface is already occupied. Because of this, it is common that a PUCCH transmission carrying hybrid automatic repeat request (HARQ) feedback may be delayed because of LBT. These delayed HARQ bits may have to be transmitted in a subsequent PUCCH opportunity, causing the payload on the subsequent PUCCH to increase. This increase in payload size will mean that low payload formats of PUCCH, such as sequence-based PUCCH, e.g., NR PUCCH format 0 and 1, may not be suitable for NR-U. The following observation follows: NR PUCCH formats 0 and 1 (1-2 bit payload) may not be suitable for NR-U For this reason, some embodiments may include extensions to PUCCH formats 2 and 3 (suitable for a wider range of payloads) in the following discussion. To achieve user-multiplexing, the extensions to PUCCH format 2 (PF2) and PF3 consider the application of cyclic shifts and OCC's applied to the reference and data (control) symbols, respectively. Such approaches may be applied in either the frequency domain, time domain, or both. The desired level of multiplexing depends on the frequency and time span of the orthogonal sequences. The examples provided herein provide a "toolbox" of approaches that may be used, taking account of the impact on performance. Further discussion is provided to describe the design based on target levels of user-multiplexing.

Some embodiments implement a PUCCH format using Frequency Division Multiplexing (FDM) between data subcarriers and DMRS subcarriers within one orthogonal frequency division multiplexed (OFDM) symbol. The format is based on NR PUCCH format 2 but mapped over a PRB interlace and includes user multiplexing. The multiplexing is achieved by applying intra OFDM symbol OCCs on the data subcarriers and cyclic shifts on the DMRS subcarriers, according to FIG. 1. FIG. 1 illustrates the format using 2 OFDM symbols with an inter-OFDM symbol OCC between them, on both data and DMRS. PUCCH format 2 allows for 1 or 2 symbols. However, for the evaluation, 2 symbols are used according to FIG. 1. The intra OFDM symbol OCC allows multiplexing of up to 4 WDs and the inter OFDM symbol OCC in this case doubles that multiplexing capacity to 8 WDs. Because of the reduced multiplexing capacity from PRB interlacing, it may make sense to utilize all possible multiplexing options to recover as much of the loss due to interlacing as possible. This PUCCH format can carry payloads of from 1 to 11 bits using the NR PUCCH format 2 Reed Muller block code and payloads above 11 bits using a NR PUCCH format 2 polar code. The data/DMRS FDM mapping may be repeated over all PRBs in the interlace. The data bits may be coded over all available unique data quadrature phase shift keyed (QPSK) symbols, i.e. there are no extra repetitions in the frequency domain. The OCC codes used are discrete Fourier transform (DFT)-matrix based. The DMRS sequence used when evaluating this format may be a Zadoff-Chu sequence covering all available DMRS subcarriers in the interlace. However the other choices of DMRS sequence may be used.

Figure 2:
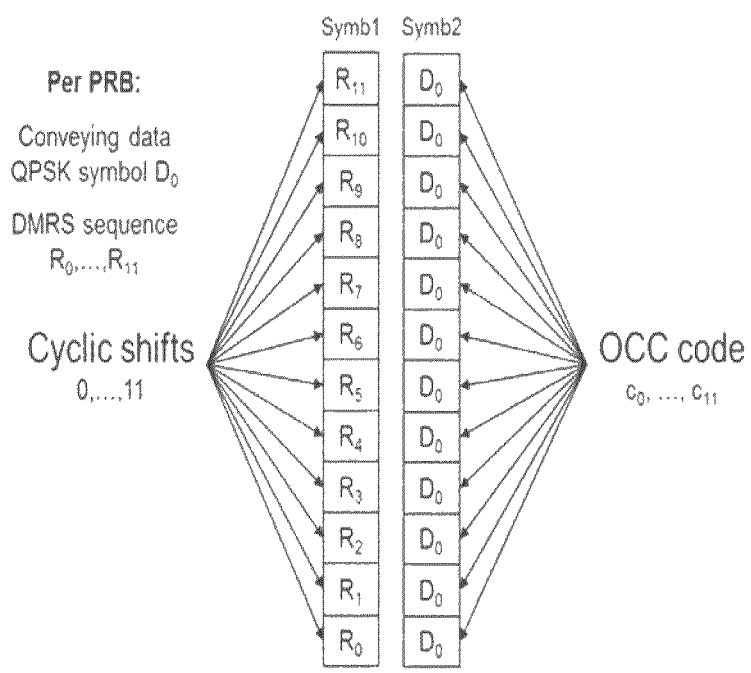
FIG. 2 is an illustration of applying inter-symbol orthogonal cover codes (OCC)

A PUCCH format using time division multiplexing (TDM) between data OFDM symbols and DMRS OFDM symbols may be employed. The format may be based on NR PUCCH format 3 but mapped over a PRB interlace with multiplexing. The multiplexing may be achieved by an intra OFDM symbol OCC on the subcarriers of the data OFDM symbols combined with cyclic shifts on the DMRS OFDM symbols according to FIG. 2. FIG. 2 illustrates the format using 2 OFDM symbols: one DMRS symbol and one data symbol. The number of symbols used in the format is not specified in conventional schemes, but at least 2 OFDM symbols may be employed. For the evaluation, 2 symbols were used according to FIG. 2. The intra OFDM symbol OCC allows multiplexing of up to 12 WDs. Because of the reduced multiplexing capacity from the PRB interlacing structure, it may make sense to utilize all possible multiplexing options to recover as much as possible. The format can carry payloads of 1 to 11 bits using the NR PUCCH format 3 Reed Muller block code and payloads above 11 bits using the NR PUCCH format 3 polar code. The data bits may be coded over all available unique data QPSK symbols, i.e., no extra repetitions in the frequency domain. If 4 or more OFDM symbols are used, i.e., at least 2 data symbols and 2 DMRS symbols, it may also be possible to use inter OFDM symbol OCC on both data and DMRS. The OCC codes used may be discrete Fourier transform (DFT)-matrix based. The DMRS sequence used when evaluating this format may be a Zadoff-Chu sequence covering all available DMRS subcarriers in the interlace. Since DFT-s-OFDM can cause degradations when used over a frequency selective channel and a NR-U PUCCH uses a large bandwidth, DFT-spreading may not be usable.

As a comparison to the multiplexing capacity of the PUCCH candidates presented in the above sections, the multiplexing capacity of MulteFire (MF), MF-sPUCCH and MF-ePUCCH, is also considered. The NR-U PUCCH candidates presented here offer up to double the capacity compared to MulteFire. The multiplexing capacity, summarized in Table 1, is calculated as the number of maximum WDs multiplexed per PRB and OFDM symbol. For example, MF-sPUCCH covers 10 PRBs and 4 OFDM symbols and can multiplex 12 WDs. Hence, the capacity is 12/(10*4)=0.3 WDs/(PRB and symbol). The use of an interlaced structure covering 10 PRBs is an example for NR-U representing a subcarrier spacing of 15 kHz with bandwidth of 20 MHz. The actual capacity for other numerologies will differ, but the relation between different formats may remain the same. In this comparison, the NR-U PUCCH candidates use 2 OFDM symbols, but other symbol length may give the same capacity if inter symbol OCC is used. The numerology used here also makes it possible to compare capacity directly to the MulteFire formats.

TABLE 1

| Format | PRBs | Symbols | Capacity | UEs/(PRB & symbol) |
|---|---|---|---|---|
| FDM with intra data symbol OCC | 10 | 2 | 8 (see 2.1.1) | 0.4 |
| Intra data symbol OCC | 10 | 2 | 12 (see 2.1.2) | 0.6 |
| MF-sPUCCH | 10 | 4 | 12 | 0.3 |
| MF-ePUCCH | 10 | 14 | 5 | 0.035714 |

The candidates discussed above have been evaluated by means of simulation for various payloads at their maximum multiplexing capacity. The operating point for all cases, defined as the signal to noise ratio (SNR) where P(ACK to Error)⇐0.01, P(NACK to ACK)⇐0.001 and P(DTX to ACK)⇐0.01 are satisfied, have been converted into a more suitable "relative transmission power" by compensating for the number of used PRBs according to the following equation:

relative transmission power=10*log 10(numPRB)+ operatingPointSNR.

This "relative transmission power" can be regarded as a normalized transmission power required at the WD. Signal to noise ratio (SNR), at least in this case, is defined as the signal to noise ratio per PRB. Hence, SNR may not be comparable when comparing formats with different number of PRBs, since each added PRB adds to the transmission power but not to the SNR.

The simulation assumptions are summarized in Table 2. The formats are, in this evaluation, mapped to the interlace structure described in Table 2, which consists of 10 PRBs spread in frequency such that every 10th PRB may be used. This interlace structure has 10 interlaces. The compared formats are mapped to 2 OFDM symbols for comparison.

TABLE 2

| Property | Value |
|---|---|
| Carrier frequency | 5 GHz |
| Bandwidth | 20 MHz |
| Subcarrier spacing | 15 kHz |

TABLE 2-continued

| Property | Value |
| --- | --- |
| Propagation channel | TDL-A 3 km/h, delay spread (DS) 30 ns/300 ns |
| Number of PRBs | 10 |
| PRB interlacing | 1:10:100 |
| Number of receive antennas | 2 |
| Number of OFDM symbols | 2 |

Figure 3:
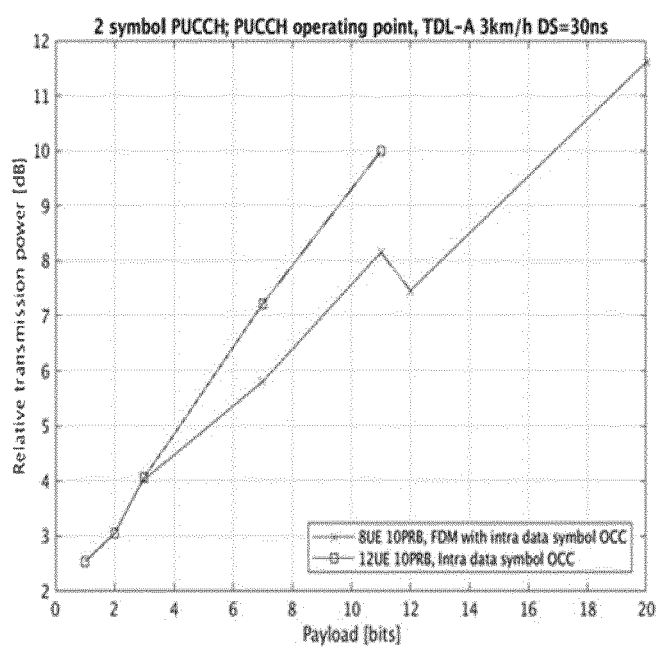
FIG. 3 is a graph of relative transmission power versus number of payload bits for 2 symbol PUCCH for delay spread (DS) equal to 30 nanoseconds.
Figure 4:
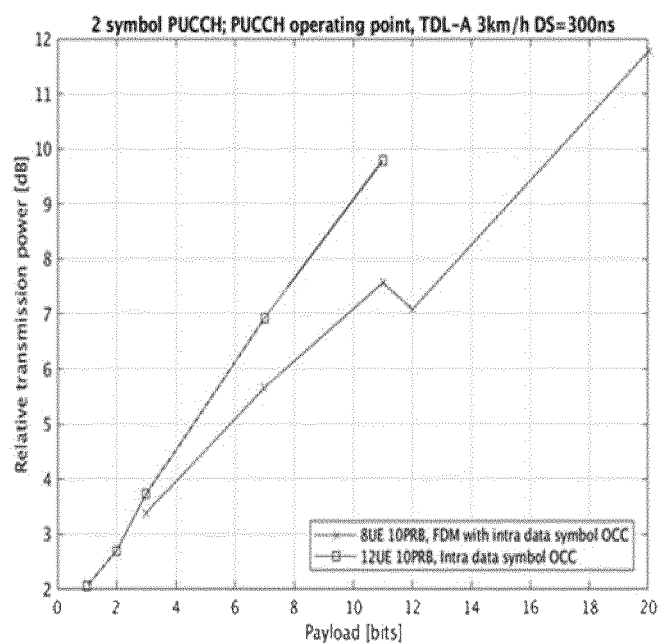
FIG. 4 is a graph of relative transmission power versus number of payload bits for DS equal to 300 nanoseconds.

Besides the NR-U candidate formats shown here, various formats based on NR PUCCH format 0 have also been evaluated, even though they may not offer high enough payload. These simulations showed that the format 0 based formats may be inferior either in multiplexing or in performance. The simulation results are shown in FIGS. 3 and 4. The PF3-based format can multiplex 50% more users than the PF2-based format at a comparable performance and is therefore well-suited for use with NR-U.

Thus, some embodiments may incorporate at least one of the following features:

A PUCCH format based on NR PF3 may be adopted for NR-U.

WD Multiplexing on the NR-PF3-based PUCCH may be based on intra OFDM symbol OCC over the data subcarriers per PRB and cyclic shifts.

The NR-PF3-based PUCCH may use the Reed Muller block code used in NR for payloads of 1 to 11 bits and the polar coder used in NR for payloads above 11 bits.

Figure 5:
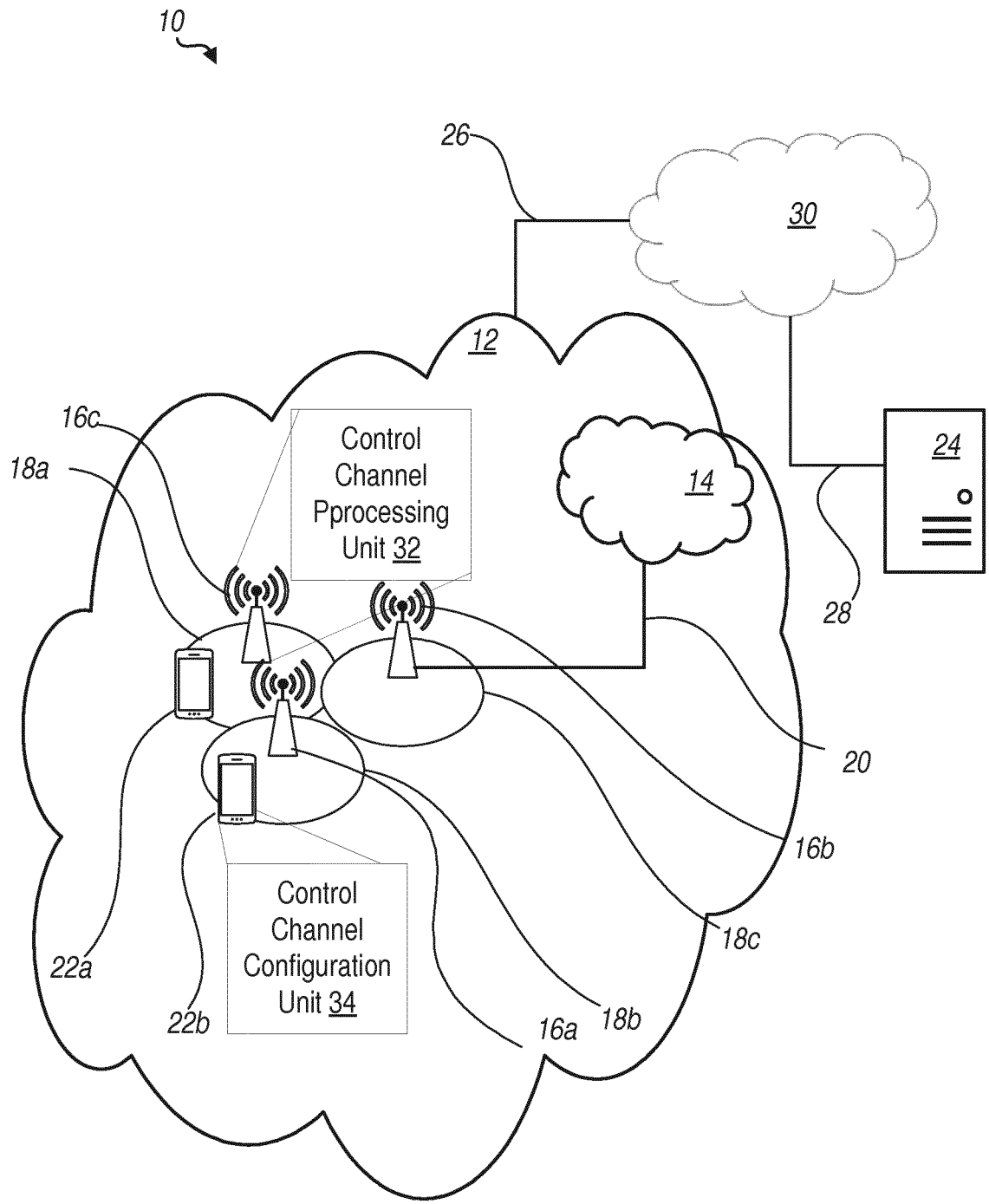
FIG. 5 is a schematic diagram of an exemplary network architecture illustrating a communication system connected via an intermediate network to a host computer according to the principles in the present disclosure.

Returning now to the drawing figures, in which like elements are referred to by like reference numerals, there is shown in FIG. 5 a schematic diagram of a communication system 10, according to an embodiment, such as a 3GPP-type cellular network that may support standards such as long term evolution (LTE) and/or NR (also known as fifth generation (5G)), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 5 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a control channel processing unit 32 configured to process a multiplexed encoded control channel. A wireless device 22 is configured to include a control channel configuration unit 34 to increase capacity on a control channel when using FDM by applying cyclic shifts on the DMRS and applying intra data subcarrier OCCs to the data subcarriers.

Example implementations, in accordance with an embodiment, of the WD 22, network node 16 and host computer 24 discussed in the preceding paragraphs will now be described with reference to FIG. 6. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive data, information, signaling, etc., from the network node 16 and or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. In particular, network node 16 is configured to include a control channel processing unit 32 configured to process a multiplexed encoded control channel.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a control channel configuration unit 34 to increase capacity on a control channel when using FDM by applying cyclic shifts on the DMRS and applying intra data subcarrier OCCs to data subcarriers.

Figure 6:
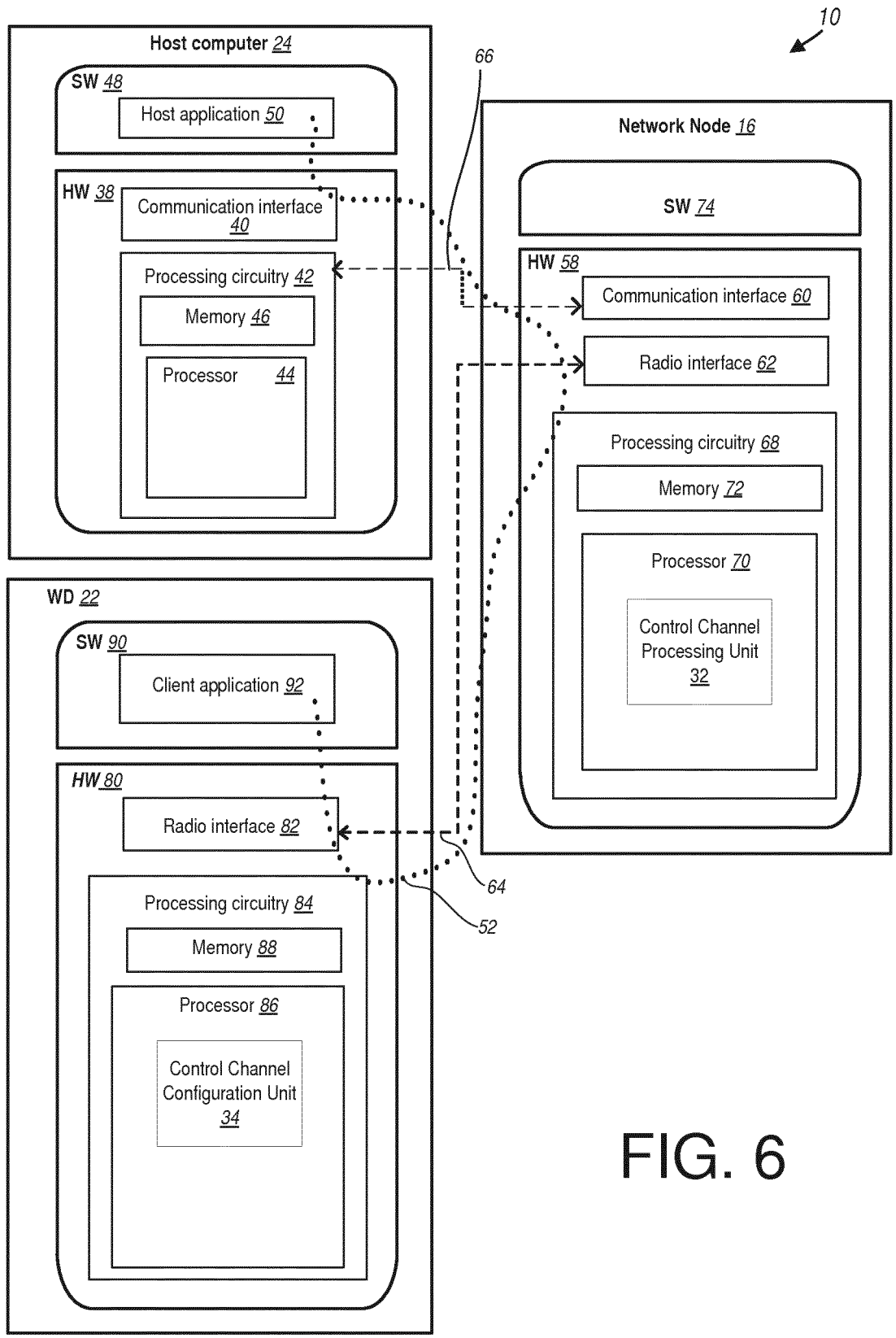
FIG. 6 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 6 and independently, the surrounding network topology may be that of FIG. 5.

In FIG. 6, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 5 and 6 show various "units" such as control channel processing unit 32 and control channel configuration unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 7:
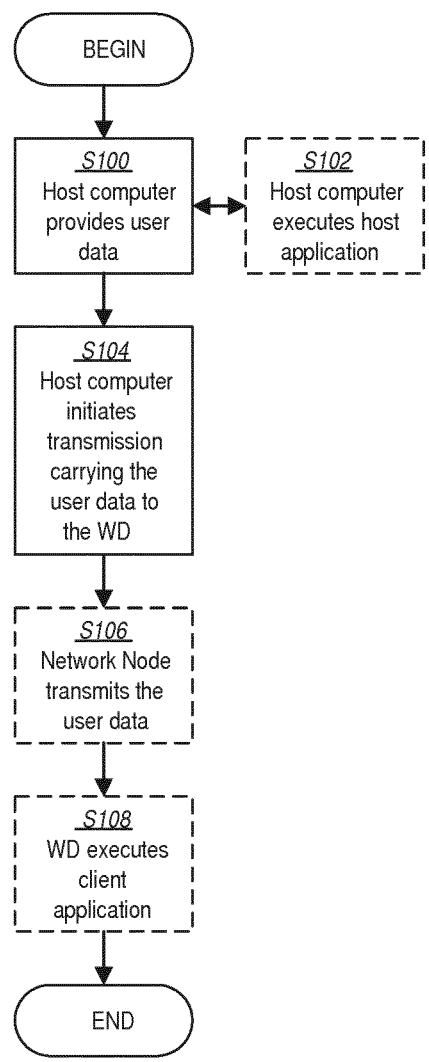
FIG. 7 is a flowchart illustrating exemplary methods implemented in a communication system including a host computer, a network node and a wireless device for executing a client application at a wireless device according to some embodiments of the present disclosure.

FIG. 7 is a flowchart illustrating an exemplary method implemented in a communication system, such as, for example, the communication system of FIGS. 5 and 6, in accordance with one embodiment. The communication system may include a host computer 24, a network node 16 and a WD 22, which may be those described with reference to FIG. 6. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 114, associated with the host application 50 executed by the host computer 24 (block S108).

Figure 8:
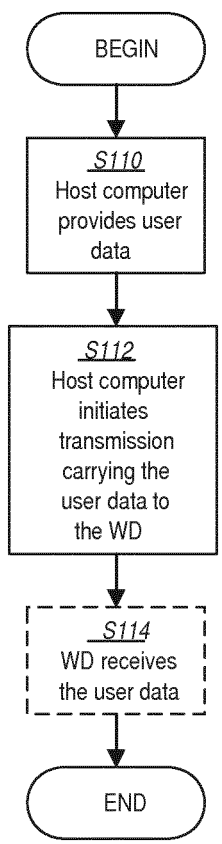
FIG. 8 is a flowchart illustrating exemplary methods implemented in a communication system including a host computer, a network node and a wireless device for receiving user data at a wireless device according to some embodiments of the present disclosure.

FIG. 8 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In a first step of the method, the host computer 24 provides user data (block S110). In an optional substep (not shown) the host computer 24 provides the user data by executing a host application, such as, for example, the host application 50. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

Figures 9, 10:
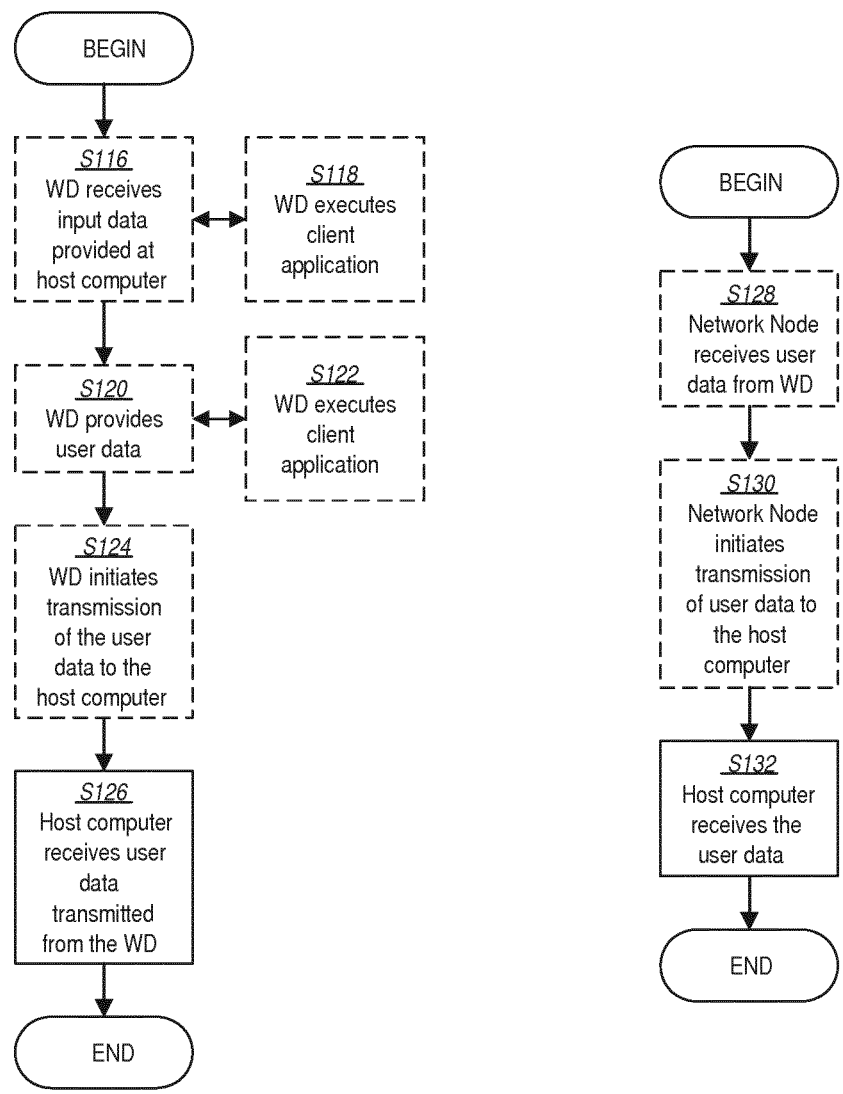
FIG. 9 is a flowchart illustrating exemplary methods implemented in a communication system including a host computer, a network node and a wireless device for receiving user data from the wireless device at a host computer according to some embodiments of the present disclosure.
FIG. 10 is a flowchart illustrating exemplary methods implemented in a communication system including a host computer, a network node and a wireless device for receiving user data at a host computer according to some embodiments of the present disclosure.

FIG. 9 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD 22 provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 10 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 11:
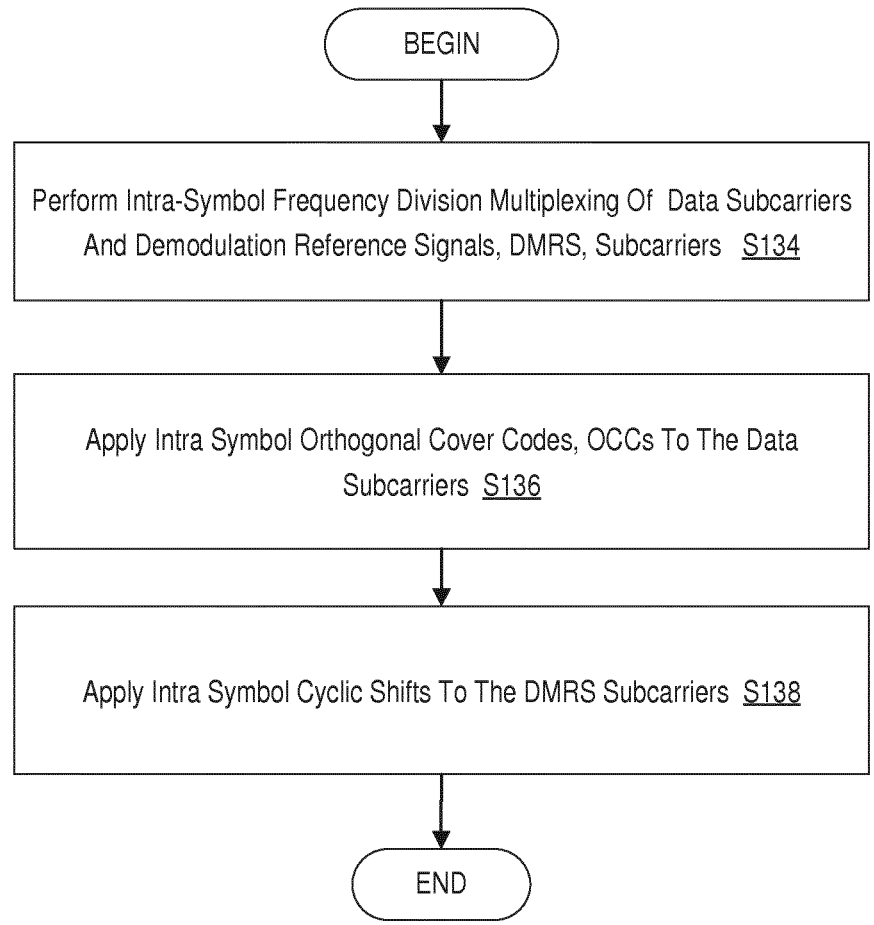
FIG. 11 is a flowchart of an exemplary process in a wireless device for increasing multiplexing capacity in a WD according to some embodiments of the present disclosure.

FIG. 11 is a flowchart of an exemplary process in a WD 22 for increasing capacity on a control channel. One or more blocks described herein may be performed by one or more elements of wireless device 22 such as by one or more of processing circuitry 84 (including the control channel configuration unit 34), processor 86, radio interface 82 and/or communication interface 60. Wireless device 22 such as via processing circuitry 84 and/or processor 86 and/or radio interface 82 is configured to perform intra-symbol frequency division multiplexing of data subcarriers and demodulation reference signal, DMRS, subcarriers (block S134). The process further includes applying intra-symbol orthogonal cover codes, OCCs, to the data subcarriers (block S136) and applying intra-symbol cyclic shifts to the DMRS subcarriers (block S138). It is noted that, although the flow charts provided herein depict various steps as being performed in a particular sequence, implementations are not limited to such arrangements. For example, the steps performed by blocks S136 and S138 can be performed in parallel and are not limited to the serial sequence shown in FIG. 11.

Figure 12:
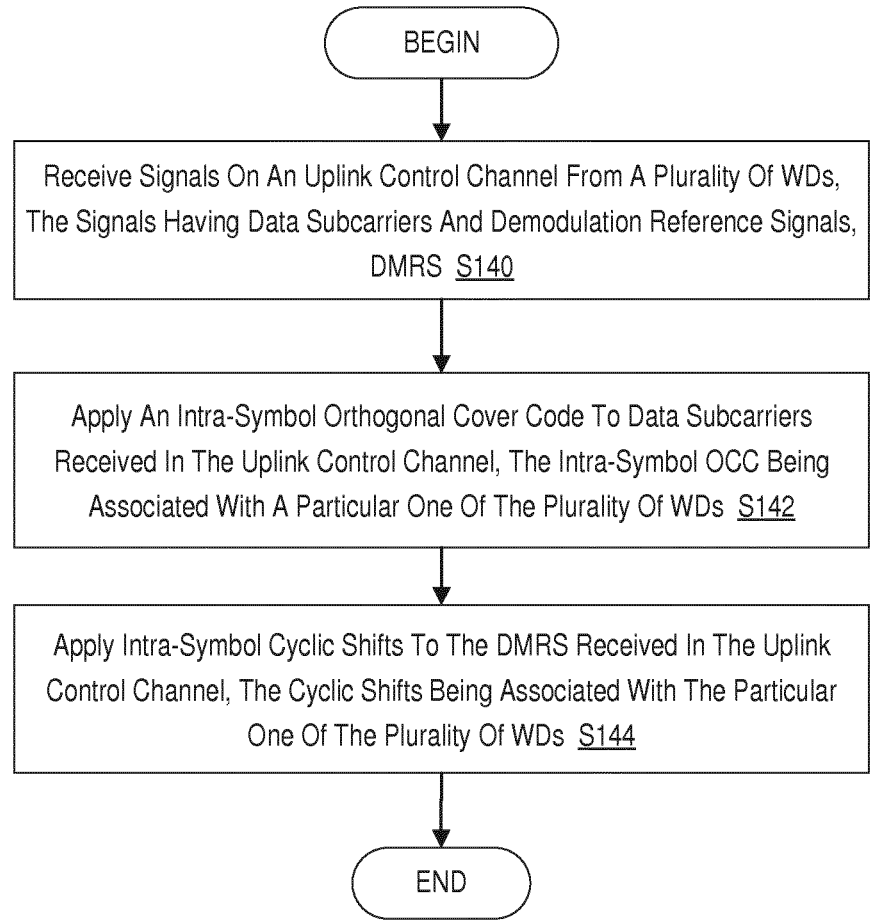
FIG. 12 is a flowchart of an exemplary process in a network node for processing an uplink control channel according to methods described herein.

FIG. 12 is a flowchart of an exemplary process in a network node 16 for receiving and processing an uplink control channel. One or more blocks described herein may be performed by one or more elements of network node 16 such as by one or more of processing circuitry 68, (including control channel processing unit 32) processor 70, radio interface 62 and/or communication interface 60. Network node 16 such as via processing circuitry 68 and/or processor 70 and/or radio interface 62 and/or communication interface 60 is configured to receive signals on an uplink control channel from a plurality of WDs, the signals having data subcarriers and demodulation reference signals, DMRS (Block S140). The process also includes applying an intra-symbol orthogonal cover code to data subcarriers received in the uplink control channel, the intra-symbol OCC being associated with a particular one of the plurality of WDs (Block S142). The process further includes applying intra-symbol cyclic shifts to the DMRS received in the uplink control channel, the cyclic shifts being associated with the particular one of the plurality of WDs (Block S144).

Having described the general process flow of arrangements of the disclosure and having provided examples of hardware and software arrangements for implementing the processes and functions of the disclosure, the sections below provide further discussion and examples of arrangements for increasing the capacity on a control channel of a New Radio unlicensed (NR-U) system when using Frequency Division Multiplexing (FDM) of data and demodulation reference signals (DMRS) by applying cyclic shifts on the DMRS and applying intra data Orthogonal Cover Codes (OCCs) to the data subcarriers.

In NR-U, the UL transmission may be spread over multiple PRBs to satisfy the requirements for unlicensed band operation. For example, the Physical Uplink Control Channel (PUCCH) could be made to cover 10 PRBs instead of, for example, the 1 PRB used in NR. Thus, in this case, the multiplexing capacity is reduced by 90%. Consider a format using FDM between data subcarriers and DMRS subcarriers, for example NR PUCCH format 2. NR PUCCH format 2 does not support WD multiplexing. But, if adapting the format for use in NR-U, it may be useful to include support for multiplexing to mitigate the effects of the above mentioned reduced NR-U multiplexing.

Figure 13:
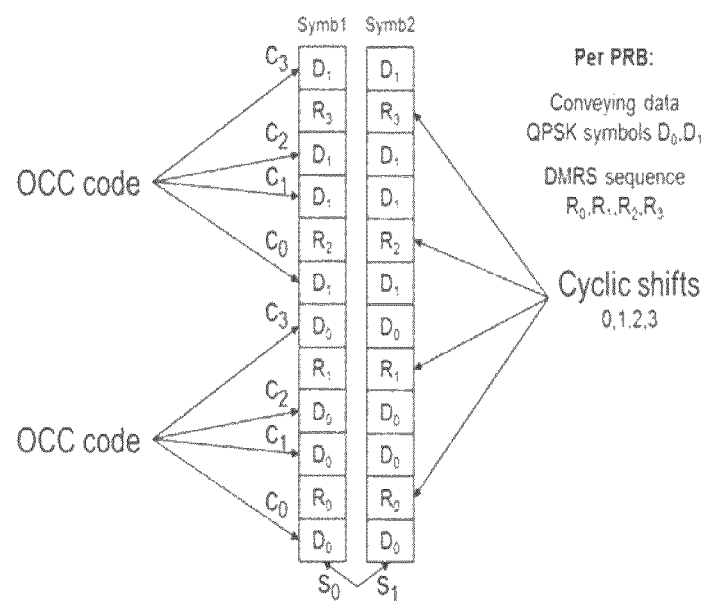
FIG. 13 is an illustration of multiplexing of data subcarriers and DMRS subcarriers according to some embodiments of the present disclosure.

Embodiments include methods to increase multiplexing for formats using FDM between data subcarriers and DMRS subcarriers. NR PUCCH format 2, for example, has 8 data subcarriers and 4 DMRS subcarriers per PRB and symbol. Since there are 4 DMRS subcarriers available, then there are 4 orthogonal cyclic shifts of the DMRS available for each PRB. These cyclic shifts can together with an Orthogonal Cover Code (OCC) on the data subcarriers be used to multiplex 4 WDs per PRB and symbol. This is illustrated in FIG. 1, reproduced in FIG. 13, where there is also an additional OCC between the 2 OFDM symbols. In this example, a WD is assigned 1 out of 4 cyclic shifts and an OCC (c0, c1, c2, c3) out of 4 possible OCCs. The actual mapping in FIG. 13 is an example. Other mappings are possible. This mapping can carry 2 QPSK symbols of data per PRB. In some embodiments, the increased multiplexing by the WD 22 can be performed upon instructions received from the network node 16 to increase multiplexing.

Besides the multiplexing example for use with NR PUCCH format 2, it is also possible to modify the format to increase the multiplexing, for example, by reallocating the number of data and DMRS subcarriers. An example is to FDM 6 data subcarriers with 6 DMRS subcarriers which would give a multiplexing capacity of 6 WDs per PRB and symbol. This mapping would be able to carry 1 QPSK symbol of data per PRB. Note that although QPSK is discussed herein, some embodiments may employ other levels or types of modulation.

Thus, according to one aspect, a WD 22, is configured to communicate with a network node 16 on an uplink control channel. The WD 22 includes processing circuitry 84 configured to configure the uplink control channel by performing intra-symbol frequency division multiplexing of data subcarriers and demodulation reference signal, DMRS, subcarrier. The uplink control channel is further configured by applying intra-symbol orthogonal cover codes, OCCs, to the data subcarrier, and applying intra-symbol cyclic shifts to the DMRS subcarriers.

According to this aspect, in some embodiments, the processing circuitry 84 is further configured to configure the uplink control channel by applying inter-symbol OCCs to both the data subcarriers and the DMRS subcarriers. In some embodiments, the data subcarriers are modulated DMRS sequences to which cyclic shifts are applied. In some embodiments, cyclic shifts applied to the data subcarriers are the same as cyclic shifts applied to the DMRS subcarriers. In some embodiments, the control channel is a modified New Radio physical uplink control channel, NR PUCCH, format 2 having a multiplexing capacity of 4 WDs 22 per physical resource block, PRB. In some embodiments, a PRB carries 2 quadrature phase shift keyed symbols. In some embodiments, the control channel is a modified New Radio physical uplink control channel, NR PUCCH, format 2 having a multiplexing capacity of 6 WDs 22 per physical resource block, PRB, wherein a number of multiplexed data subcarriers and DMRS subcarriers is six each. In some embodiments, a PRB carries 1 quadrature phase shift keyed symbol. In some embodiments, a total length of a DMRS and/or a data sequence is less than or equal to 12 subcarriers. In some embodiments, the DMRS and data sequences are mapped to non-contiguous subcarriers.

According to another aspect, a method in a wireless device, WD 22, configured to communicate with a network node 16 on an uplink control channel is provided. The method includes performing (S134) intra-symbol frequency division multiplexing of data subcarriers and demodulation reference signal, DMRS, subcarriers (S136). The method further includes applying intra-symbol orthogonal cover codes, OCCs, to the data subcarriers. The method also includes applying intra-symbol cyclic shifts to the DMRS subcarriers (S138).

According to this aspect, in some embodiments, the method further includes applying inter-symbol OCCs to both the data subcarriers and the DMRS subcarriers. In some embodiments, the data subcarriers are modulated DMRS sequences to which cyclic shifts are applied. In some embodiments, cyclic shifts applied to the data subcarriers are the same as cyclic shifts applied to the DMRS subcarriers. In some embodiments, the control channel is a modified New Radio physical uplink control channel, NR PUCCH, format 2 having a multiplexing capacity of 4 WDs 22 per physical resource block, PRB. In some embodiments, a PRB carries 2 quadrature phase shift keyed symbols. In some embodiments, the control channel is a modified New Radio physical uplink control channel, NR PUCCH, format 2 having a multiplexing capacity of 6 WDs 22 per physical resource block, PRB, wherein a number of multiplexed data subcarriers and DMRS subcarriers is six each. In some embodiments, a PRB carries 1 quadrature phase shift keyed symbol. In some embodiments, a total length of a DMRS and/or a data sequence is less than or equal to 12 subcarriers. In some embodiments, the DMRS and data sequences are mapped to non-contiguous subcarriers.

According to yet another aspect, a network node 16 is configured to receive an uplink control channel from each of a plurality of wireless devices, WD 22. The network node 16 includes processing circuitry 68 configured to receive signals on an uplink control channel from a plurality of WDs 22, the signals having data subcarriers and demodulation reference signals, DMRS. The processing circuitry 68 is further configured to apply an intra-symbol orthogonal cover code to data subcarriers received in the uplink control channel, the intra-symbol OCC being associated with a particular one of the plurality of WDs 22. The processing circuitry 68 is also configured to apply intra-symbol cyclic shifts to the DMRS received in the uplink control channel, the cyclic shifts being associated with the particular one of the plurality of WDs 22.

According to this aspect, in some embodiments, the processing circuitry 68 is further configured to apply an inter-symbol OCC to both the data subcarriers and the DMRS received in the uplink control channel, the inter-symbol OCC being associated with the particular one of the plurality of WDs 22. In some embodiments, the uplink control channel is a New Radio physical uplink control channel, NR PUCCH, format 2 having a multiplexing capacity of 4 WDs 22 per physical resource block, PRB. In some embodiments, a PRB carries 2 quadrature phase shift keyed symbols. In some embodiments, the control channel is a New Radio physical uplink control channel, NR PUCCH, format 2 having a multiplexing capacity of 6 WDs 22 per physical resource block, PRB, wherein a number of multiplexed data subcarriers and DMRS subcarriers is six each. In some embodiments, a PRB carries 1 quadrature phase shift keyed symbol.

According to another aspect, a method in a network node 16 configured to receive an uplink control channel from each of a plurality of wireless devices is provided. The method includes receiving signals on an uplink control channel from a plurality of WDs 22, the signals having data subcarriers and demodulation reference signals, DMRS (S140). The method further includes applying an intra-symbol orthogonal cover code to data subcarriers received in the uplink control channel, the intra-symbol OCC being associated with a particular one of the plurality of WDs 22 (S142). The method also includes applying intra-symbol cyclic shifts to the DMRS received in the uplink control channel, the cyclic shifts being associated with the particular one of the plurality of WDs 22 (S144).

According to this aspect, in some embodiments, the method further includes applying an inter-symbol OCC to both the data subcarriers and the DMRS received in the uplink control channel, the inter-symbol OCC being associated with the particular one of the plurality of WDs 22. In some embodiments, the uplink control channel is a New Radio physical uplink control channel, NR PUCCH, format 2 having a multiplexing capacity of 4 WDs 22 per physical resource block, PRB. In some embodiments, a PRB carries 2 quadrature phase shift keyed symbols. In some embodiments, the control channel is a New Radio physical uplink control channel, NR PUCCH, format 2 having a multiplexing capacity of 6 WDs 22 per physical resource block, PRB, wherein a number of multiplexed data subcarriers and DMRS subcarriers is six each. In some embodiments, a PRB carries 1 quadrature phase shift keyed symbol.

Some embodiments include:

Embodiment 1

A method to increase multiplexing capacity when using FDM between data subcarriers and DMRS subcarriers by using cyclic shifts on DMRS and intra data subcarrier OCC for at least the data subcarriers.

Embodiment 1-a

The method of Embodiment 1 where an OCC is applied across OFDM symbols for both data and DMRS subcarriers.

Embodiment 1-b

The method of Embodiment 1, where the data subcarriers are modulated DMRS sequences and multiplexing of the data subcarriers are solved with cyclic shifts of those DMRS sequences. Either the same or different cyclic shifts can be used on the data subcarriers and the DMRS subcarriers.

Embodiment 2

The method of Embodiment 1 applied to NR PUCCH format 2 to achieve a multiplexing capacity of 4 WDs per PRB.

Embodiment 3

The method of Embodiment 1 applied to a modified version of NR PUCCH format 2 which has 6 DMRS subcarriers and 6 data subcarriers per PRB. This modified version has a multiplexing capacity of 6 WDs per PRB. A length-6 cyclic shift sequence may be used for both DMRS and data, if the data subcarriers are modulated DMRS sequences.

Embodiment 4

The method of Embodiment 1 applied to a physical resource unit which includes more or less than 12 subcarriers instead of a PRB. In some embodiments, the total lengths of DMRS and data sequences can be larger or less than 12.

In some embodiments, the DMRS and data sequences can be mapped to contiguous or non-contiguous subcarriers.

In some embodiments, a wireless device (WD) 22 is configured to communicate with a network node 16 and has processing circuitry 84 configured to frequency division multiplex data subcarriers and demodulation reference signals, DMRS, subcarriers by: applying cyclic shifts on the DMRS; and applying intra data subcarrier orthogonal cover codes, OCCs, to the DMRS subcarriers and/or the data subcarriers. In some embodiments, the frequency division multiplexing may be based on instructions received from the network node 16. Similarly, in some embodiments, information such as the OCCs may be provided to the WD 22 by the network node 16.

In some embodiments, an OCC is applied across orthogonal frequency division multiplex symbols for the data subcarriers and the DMRS subcarriers. In some embodiments, the multiplexing is with cyclic shifts of the data subcarriers, where the data subcarriers are modulated DMRS sequences. In some embodiments, same cyclic shifts are used on the data subcarriers and the DMRS subcarriers. In some embodiments, the control channel is a New Radio physical uplink control channel, NR PUCCH, format 2 having a multiplexing capacity of 4 WDs per physical resource block, PRB. In some embodiments, a PRB carries 2 quadrature phase shift keyed symbols. In some embodiments, the control channel is a New Radio physical uplink control channel, NR PUCCH, format 2 having a multiplexing capacity of 6 WDs per physical resource block, PRB. In some embodiments, a PRB carries 1 quadrature phase shift keyed symbol. In some embodiments, a total length of a DMRS and/or a data sequence is larger than 12 subcarriers. In some embodiments, the DMRS and data sequences are mapped to contiguous subcarriers.

In some embodiments, a method implemented in a wireless device (WD) 22 is provided. The method includes frequency division multiplexing data subcarriers and demodulation reference signals, DMRS, subcarriers by: applying cyclic shifts on the DMRS (block S136); and applying intra data subcarrier orthogonal cover codes, OCCs to the DMRS subcarriers and/or the data subcarriers (block S138). In some embodiments, an OCC is applied across orthogonal frequency division multiplex symbols for the data subcarriers and the DMRS subcarriers. In some embodiments, the multiplexing is with cyclic shifts of the data subcarriers, where the data subcarriers are modulated DMRS sequences. In some embodiments, same cyclic shifts are used on the data subcarriers and the DMRS subcarriers. In some embodiments, the control channel is a New Radio physical uplink control channel, NR PUCCH, format 2 with multiplexing capacity of 4 WDs per physical resource block, PRB. In some embodiments, a PRB carries 2 quadrature phase shift keyed symbols. In some embodiments, the control channel is a New Radio physical uplink control channel, NR PUCCH, format 2 with multiplexing capacity of 6 WDs per physical resource block, PRB. In some embodiments, a PRB carries 1 quadrature phase shift keyed symbol. In some embodiments, a total length of a DMRS and/or a data sequence is larger than 12 subcarriers. In some embodiments, the DMRS and data sequences are mapped to contiguous subcarriers.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device, WD, configured to communicate with a network node on an uplink control channel, the WD including processing circuitry configured to configure the uplink control channel by:
   performing intra-symbol frequency division multiplexing of data subcarriers and demodulation reference signal, DMRS, subcarriers;
   applying intra-symbol orthogonal cover codes, OCCs, to the data subcarriers;
   applying intra-symbol cyclic shifts to the DMRS subcarriers;
   the data subcarriers being modulated DMRS sequences to which cyclic shifts are applied; and
   cyclic shifts applied to the data subcarriers are the same as cyclic shifts applied to the DMRS subcarriers.

2. The wireless device of claim 1, wherein the processing circuitry is further configured to configure the uplink control channel by applying inter-symbol OCCs to both the data subcarriers and the DMRS subcarriers.

3. The wireless device of claim 1, wherein the control channel is a New Radio physical uplink control channel, NR PUCCH, format 2 having a multiplexing capacity of 4 WDs per physical resource block, PRB.

4. The wireless device of claim 3, wherein a PRB carries 2 quadrature phase shift keyed symbols.

5. The wireless device of claim 1, wherein the control channel is a New Radio physical uplink control channel, NR PUCCH, format 2 having a multiplexing capacity of 6 WDs per physical resource block, PRB, wherein a number of multiplexed data subcarriers and DMRS subcarriers is six each.

6. The wireless device of claim 5, wherein a PRB carries 1 quadrature phase shift keyed symbol.

7. The wireless device of claim 1, wherein a total length of at least one of a DMRS and a data sequence is less than or equal to 12 subcarriers.

8. A method in a wireless device, WD, configured to communicate with a network node on an uplink control channel, the method comprising:
   performing intra-symbol frequency division multiplexing of data subcarriers and demodulation reference signal, DMRS, subcarriers;
   applying intra-symbol orthogonal cover codes, OCCs, to the data subcarriers;
   applying intra-symbol cyclic shifts to the DMRS subcarriers;
   the data subcarriers being modulated DMRS sequences to which cyclic shifts are applied; and
   cyclic shifts applied to the data subcarriers are the same as cyclic shifts applied to the DMRS subcarriers.

9. The method of claim 8, wherein the control channel is a New Radio physical uplink control channel, NR PUCCH, format 2 having a multiplexing capacity of 4 WDs per physical resource block, PRB.

10. The method of claim 9, wherein a PRB carries 2 quadrature phase shift keyed symbols.

11. The method of claim 8, wherein the control channel is a New Radio physical uplink control channel, NR PUCCH, format 2 having a multiplexing capacity of 6 WDs per physical resource block, PRB, wherein a number of multiplexed data subcarriers and DMRS subcarriers is six each.

12. The method of claim 11, wherein a PRB carries 1 quadrature phase shift keyed symbol.

13. The method of claim 8, wherein a total length of at least one of a DMRS and a data sequence is less than or equal to 12 subcarriers.

14. The method of claim 8, wherein the DMRS and data sequences are mapped to non-contiguous subcarriers.

15. A method in a network node configured to receive an uplink control channel from each of a plurality of wireless devices, the method comprising:
  receiving signals on an uplink control channel from a plurality of WDs, the signals having data subcarriers and demodulation reference signals, DMRS;
  applying an intra-symbol orthogonal cover code to data subcarriers received in the uplink control channel, the intra-symbol OCC being associated with a particular one of the plurality of WDs;
  applying intra-symbol cyclic shifts to the DMRS received in the uplink control channel, the cyclic shifts being associated with the particular one of the plurality of WDs;
  the data subcarriers being modulated DMRS sequences to which cyclic shifts are applied; and
  cyclic shifts applied to the data subcarriers are the same as cyclic shifts applied to the DMRS subcarriers.

16. The method of claim 15, further comprising applying an inter-symbol OCC to both the data subcarriers and the DMRS received in the uplink control channel, the inter-symbol OCC being associated with the particular one of the plurality of WDs.

17. The method of claim 15, wherein the uplink control channel is a New Radio physical uplink control channel, NR PUCCH, format 2 having a multiplexing capacity of 4 WDs per physical resource block, PRB.

18. The method of claim 17, wherein a PRB carries 2 quadrature phase shift keyed symbols.

19. The method of claim 15, wherein the control channel is a New Radio physical uplink control channel, NR PUCCH, format 2 having a multiplexing capacity of 6 WDs per physical resource block, PRB, wherein a number of multiplexed data subcarriers and DMRS subcarriers is six each.

20. The method of claim 19, wherein a PRB carries 1 quadrature phase shift keyed symbol.

* * * * *